US012801751B2

(12) United States Patent
Goldsteen et al.

(10) Patent No.: US 12,801,751 B2
(45) Date of Patent: Nov. 17, 2026

(54) PROVIDING AND COMPARING CUSTOMIZED RISK SCORES FOR ARTIFICIAL INTELLIGENCE MODELS

(71) Applicant: International Business Machines Corporation, Armonk, NY (US)

(72) Inventors: Abigail Goldsteen, Haifa (IL); Michael Hind, Cortlandt Manor, NY (US); Jacquelyn Martino, Cold Spring, NY (US); David John Piorkowski, White Plains, NY (US); Orna Raz, Haifa (IL); John Thomas Richards, Honeoye Falls, NY (US); Moninder Singh, Farmington, CT (US); Marcel Zalmanovici, Kiriat Motzkin (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 811 days.

(21) Appl. No.: 18/309,049

(22) Filed: Apr. 28, 2023

(65) Prior Publication Data

US 2024/0362337 A1 Oct. 31, 2024

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS 11,777,992 B1 * 10/2023 Cross .................... G06F 16/128 726/5
2024/0211331 A1 * 6/2024 Goodsitt ................ G06N 20/00

FOREIGN PATENT DOCUMENTS

WO 2021139078 A1 7/2021

OTHER PUBLICATIONS

"CompIAI: Theory of A Unified Framework for Multi-factor Assessment of Black-Box Supervised Machine Learning Models", De et al, Dec. 30, 2022 (Year: 2022).*

(Continued)

*Primary Examiner* — Haimei Jiang
(74) *Attorney, Agent, or Firm* — Amin, Turocy & Watson, LLP

(57) ABSTRACT

One or more systems, devices, computer program products and/or computer-implemented methods provided herein relate to risk assessment for artificial intelligence models, and more specifically, to the generation of customized risk scores and converted comparable scores. In an embodiment, the customized risk assessment scores can be based on a risk profile determined from risk assessment requirements and measurements of an artificial intelligence model. In another embodiment, one or more customized risk assessment scores can be converted to a converted risk assessment score that is comparable to a customized risk assessment score or another converted risk assessment score.

13 Claims, 15 Drawing Sheets

(56) References Cited

OTHER PUBLICATIONS

"Counterfactural Fairness", Kusner et al, Mar. 8, 2018 (Year: 2018).*

Sharma, Sh. et al. | "CERTIFAI: Counterfactual Explanations for Robustness, Transparency, Interpretability, and Fairness of Artificial Intelligence models." arXiv: 1905.07857v1 [cs.LG] May 20, 2019, 8 pages.

Mitchell, M. et al. | "Model Cards for Model Reporting." arXiv:1810.03993v2 [cs.LG] Jan. 14, 2019, 10 pages.

* cited by examiner

PROVIDING AND COMPARING CUSTOMIZED RISK SCORES FOR ARTIFICIAL INTELLIGENCE MODELS

BACKGROUND

The subject disclosure relates to risk assessment for artificial intelligence models, and more specifically, to the generation of customized risk scores and converted comparable scores.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products in accordance with the present invention.

According to an embodiment, a system can comprise a memory that stores computer executable components; and a processor that executes the computer executable components stored in the memory. The computer executable components can comprise: a requirements component that receives risk assessment requirements for an artificial intelligence model; a weight component that determines weights for dimensions and metrics based on the risk assessment requirements; a risk profile generation component that combines the weights for dimensions and metrics into a single set of weights to generate a risk profile comprising weighted dimensions and weighted metrics; and a customized score component that calculates a customized risk assessment score for the artificial intelligence model based on the risk profile and measurements of the artificial intelligence model corresponding to the weighted metrics.

According to another embodiment, a computer-implemented method can comprise receiving, by a system operably coupled to a processor, a first risk profile for a first artificial intelligence model and a second risk profile for a second artificial intelligence model; determining, by the system, a third risk profile comprising intersecting metrics associated with common measurements of the first artificial intelligence model and the second artificial intelligence model; calculating, by the system, a first converted risk assessment score for the first artificial intelligence model based the third risk profile and measurements associated with the first artificial intelligence model corresponding to the intersecting metrics; and calculating, by the system, a second converted risk assessment score for the second artificial intelligence model based on the third risk profile and measurements associated with the second artificial intelligence model corresponding to the intersecting metrics.

According to still another embodiment, a computer program product for facilitating the comparison of risk assessments for multiple artificial intelligence models can comprise a computer readable storage medium having program instructions embodied therewith. The program instructions can be executable by a processor to: receive, by the processor, a first risk profile for a first artificial intelligence model and a second risk profile for a second artificial intelligence model; calculate, by the processor, a first customized risk assessment score for the first artificial intelligence model based on the first risk profile and measurements of the first artificial intelligence model associated with metrics of the first risk profile; and generate, by the processor, a second converted risk assessment score for the second artificial intelligence model based on the first risk profile and measurements of the second artificial intelligence model associated with metrics of the first risk profile.

DETAILED DESCRIPTION

Figure 1:
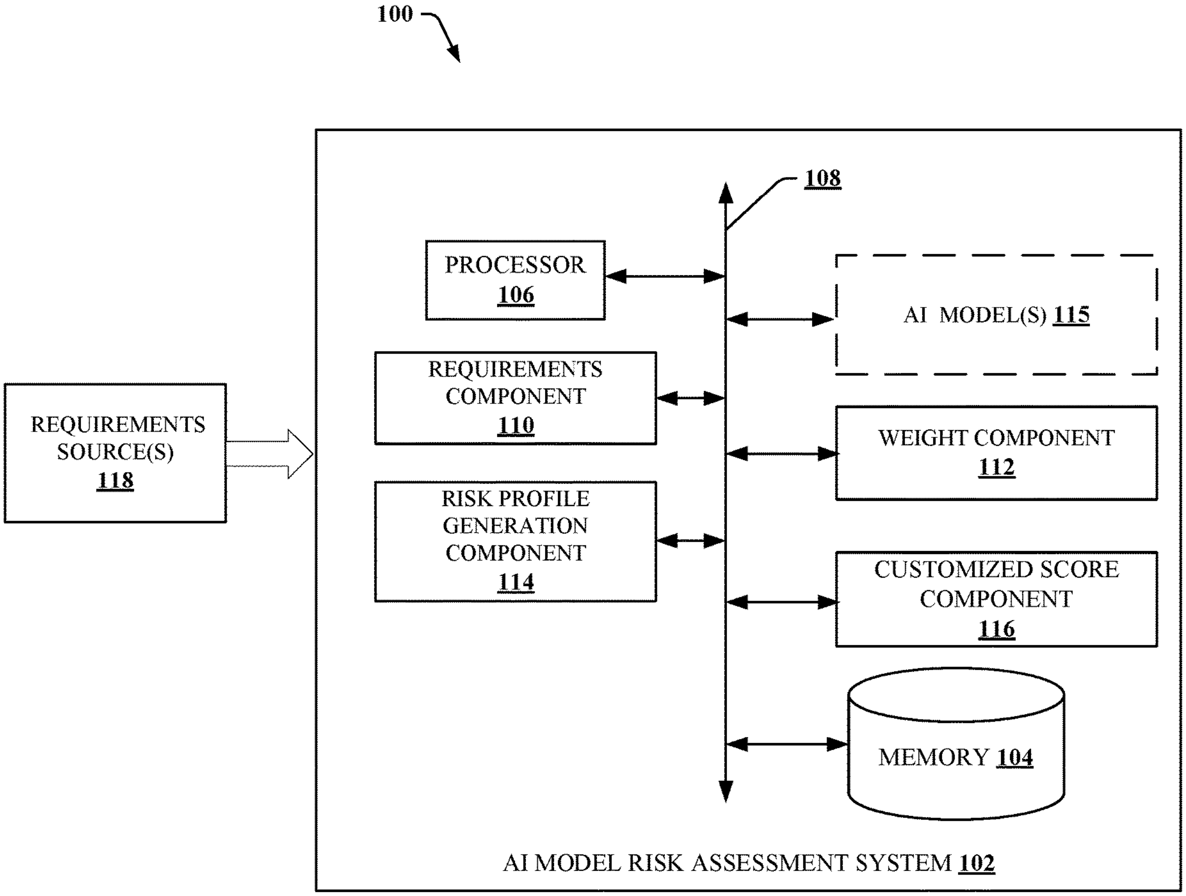
FIG. 1 illustrates a block diagram of an example, non-limiting system that can facilitate risk assessment for one or more artificial intelligence models, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As artificial intelligence (AI) technology advances, AI systems are increasingly used in various contexts and applications. For example, AI technology can be used for hiring and employment practices, fraud detection, medical diagnostics, autonomously driving vehicles, cybersecurity, personalized shopping experiences, advertisement, and much more. The consequences of a failure of an AI system can have substantial effects on individuals, organizations, or other entities that can range from inconvenient to extremely harmful. Accordingly, there is an increasing interest in understanding and managing the various risks associated with the use of AI technologies in various applications. For example, some governing bodies may impose regulations that AI models or risk assessment of AI models must comply with. Further, businesses or other organizations may impose certain policies for AI models or risk assessment of AI models. For example, a business may do this to address particular business needs. A user or other entity may also impose certain requirements on an AI model or AI model risk assessment. Such risk assessment requirements may be imposed by several different sources.

In an embodiment, imposed risk assessment requirements can be domain specific. Therefore, even the same AI model or type of AI model may be subjected to different requirements for different use cases. For example, a face recognition model can be subject to different risk assessment requirements depending on if the AI model is intended to be used in policing as opposed to general surveillance in a public space by a business. For another example, a feature recognition model for evaluating MRI scans can be subject to a certain set of risk assessment requirements while a feature recognition model for evaluating geological scans can be subject to a different set of risk assessment requirements even if the underlying machine learning technology of the two models is the same or similar. There is need for a risk assessment that can be customized based on various risk assessment requirements. The risk assessment requirements may depend on, for example, intended use, underlying machine learning technology utilized, and other factors.

The risk assessment requirements can indicate a level of importance for various dimensions and metrics that are relevant to a risk assessment of an AI model. Further, a weight or prioritization of the risk assessment requirements can be based on the source from which the risk assessment requirements originated from. For example, a risk assessment requirement from a government regulation can be prioritized over a risk assessment requirement from a business policy. In an embodiment, risk assessments for AI models comprise analysis of various dimensions (e.g., fairness, explainability, robustness). Each dimension can be assessed via one or more quantifiable metrics (e.g., disparate impact, equal opportunity, statistical parity). Metrics may have different scales or directions. In an embodiment, measurements associated with various metrics can be obtained by testing an AI model. Metrics results can be detailed and complex, requiring expertise to comprehend. Risk assessment results, however, may need to be presented in a concise and simple manner to present to decision makers such as lawmakers and business executives. There is a need for a single score that represents the overall risk associated with a model. The score can be customized to a particular model.

Further, decision makers or others may want to compare two or more models to determine a better or best possible model to use in a particular context or for a specific application. When risk assessment scores are customized, however, a direct comparison of the scores may not be meaningful because the risk assessment scores were computed in different manners. For example, the scores may have been customized to be computed based on some different dimensions and metrics. For another example, the importance or weight of the dimensions and metrics may have been different in various computations of customized risk assessment scores for various AI models. This may be the case, for example, when multiple AI models are used in different domains. Direct comparisons of measurements obtained from AI models can be complex and require expertise to accurately comprehend. Even when measurements from AI models are combined into a single customized score as described above, it can be difficult to meaningfully compare scores that were customized to the particular model being scored. It is therefore desirable to be able to generate a single customized comparable score for one or more models that can provide for a meaningful comparison between different models of the same or of different domains.

By way of overview, aspects of systems apparatuses or processes in accordance with the present invention can be implemented as machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however in various cases, that the one or more embodiments can be practiced without these specific details. As used herein, the term "entity" can refer to a machine, device, component, hardware, software, smart device and/or human.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100, 200, 300, and/or 400 as illustrated at FIGS. 1-4, and/or systems thereof, can further comprise, be associated with and/or be coupled to one or more computer and/or computing-based elements described herein with reference to an operating environment, such as the operating environment 1500 illustrated at FIG. 15. In one or more described embodiments, computer and/or computing-based elements can be used in connection with implementing one or more of the systems, devices, components and/or computer-implemented operations shown and/or described in connection with FIGS. 1-4 and/or with other figures described herein.

FIG. 1 illustrates a block diagram of an example, non-limiting AI model risk assessment system 102 that facilitates risk assessment for an artificial intelligence model in accordance with one or more embodiments described herein. As illustrated at FIG. 1, the AI model risk assessment system 102 can comprise one or more components, such as a memory 104, processor 106, bus 108, requirements component 110, weight component 112, risk profile generation component 114, and/or customized score component 116. Generally, AI model risk assessment system 102 can facilitate calculation of a customized risk assessment score representing the result of a risk assessment for an AI model based on a risk profile generated based on risk assessment requirements and measurements of the artificial intelligence model associated with various metrics of the risk profile.

The requirements component 110 can receive risk assessment requirements for a first artificial intelligence model. In an embodiment, the first artificial intelligence model can be AI model 115. The requirements component 110 can receive risk assessment requirements from one or more requirements sources 118. For example, the requirements sources 118 may be government regulations, organizational policies, and/or user input. In an embodiment, the requirements component 110 may receive one or more risk assessment requirements from a plurality of requirements sources 118. In another embodiment, the requirements component 110 can receive a plurality of risk assessment requirements from one requirements source 118. In yet another embodiment, the requirements component 110 can receive a single risk assessment requirement from a single requirements source 118. In an embodiment the risk assessment requirements received from the requirements sources 118 can indicate how various dimensions and metrics should be weighted in a risk assessment for a model. In an embodiment, risk assessment requirements may be weighted or prioritized based on requirements source. For example, compliance with a government regulation can be more important than compliance with an organizational policy, so a risk assessment requirement from a government regulation can be prioritized over a risk assessment requirement from an organizational policy. The weight component 112 can determine weights for dimensions and metrics based on the risk assessment requirements. For example, a risk assessment requirement from a government regulation may require that the dimension of fairness be considered in a risk assessment of a model and that fairness should have a normalized weight of at least 0.5. If a risk assessment from an organizational policy indicates that a dimension of privacy should have a normalized weight of 0.6, the weight component can prioritize the risk assessment requirement from the regulation.

The risk profile generation component 114 can combine weights for dimensions and metrics into a single set of weights to generate a first risk profile comprising weighted dimensions and weighted metrics. The risk profile generation component 114 can normalize weights of dimensions and metrics for use in the risk profile. The risk profile comprises various weighted dimensions that each comprise one or more weighted metrics. The customized score component 116 can calculate a customized risk assessment score for the first artificial intelligence model based on the first risk profile and measurements of the first artificial intelligence model corresponding to the weighted metrics of the first risk profile. For example, the first artificial intelligence model can be tested to determine a quantifiable measurement that corresponds to one or more metrics in the risk profile. In an embodiment, the measurement corresponding to the quantifiable metric can be a normalized value. In an embodiment, the measurements can be obtained by running AI model 115. The customized score component 116 can apply the weighted dimensions and metrics of the risk profile to the measurements corresponding to AI model 115. Based on this, the customized score component 116 can calculate a customized score for AI model 115 that reflects results of a risk assessment for performance of AI model 115. The customized score can be a summarized score that encompasses multiple relevant dimensions and metrics to the risk assessment. Since the relevant dimensions and metrics are not hard-coded, adjusting risk assessment requirements and/or user or other entity input can affect the customized score for an artificial intelligence model.

In an embodiment, a customized score and/or a risk profile can be iteratively improved based on user or other entity feedback. For example, a user can view a customized risk assessment score and/or a risk profile for an artificial intelligence model via a user interface (not pictured). The user can input feedback regarding the customized risk assessment score and/or risk profile for the artificial intelligence model. For example, the user feedback could be instructions to change how risk assessment requirements, dimensions, or metrics are weighted. In an embodiment, the AI model risk assessment system can facilitate an iterative user feedback loop.

The various devices (e.g., system 100) and components (memory 104, processor 106, requirements component 110, weight component 112, risk profile generation component 114, customized score component 116 and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 2:
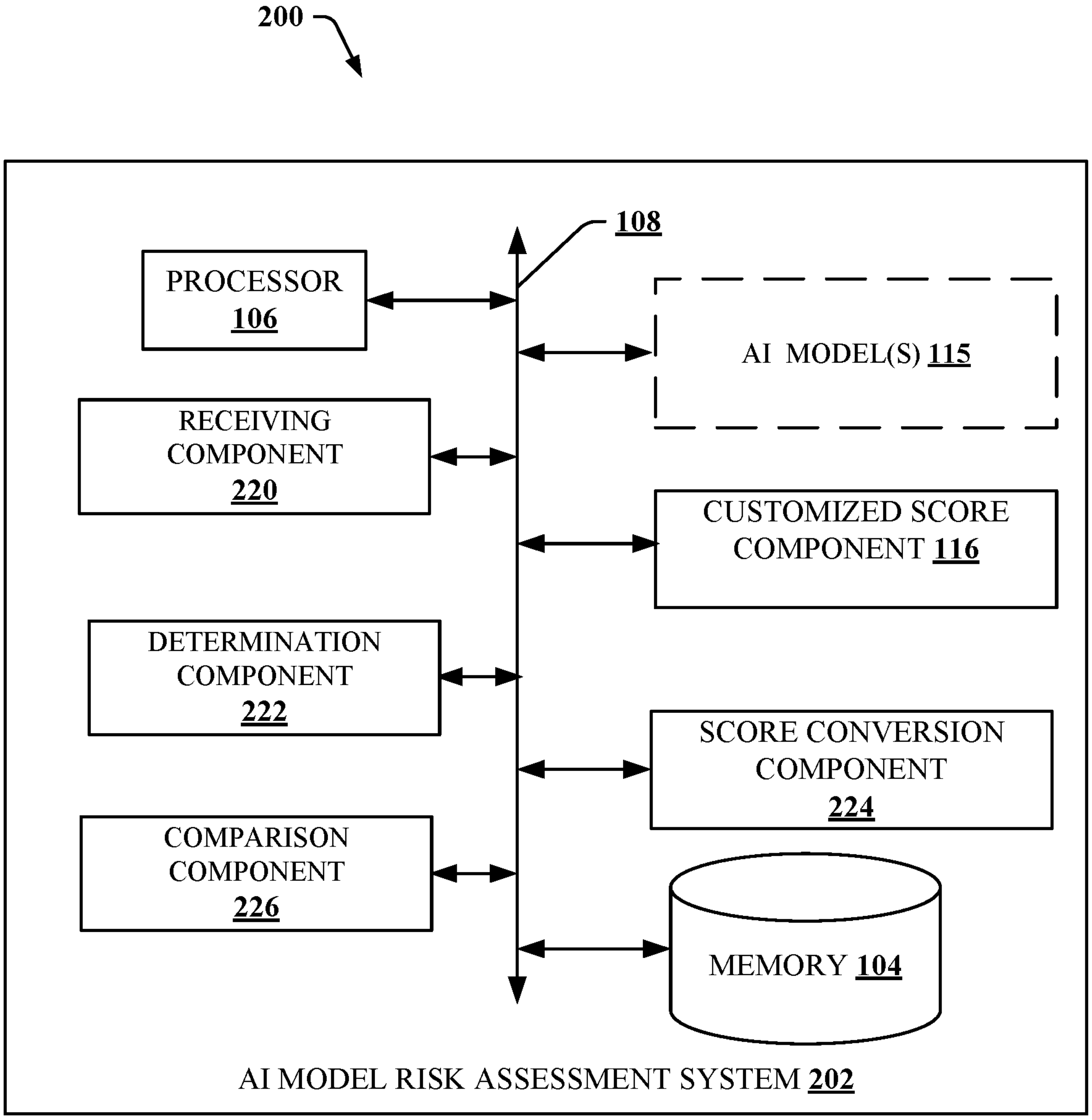
FIG. 2 illustrates another block diagram of an example, non-limiting system that can facilitate risk assessment for one or more artificial intelligence models, in accordance with one or more embodiments described herein.

FIG. 2 illustrates a block diagram of an example, non-limiting system 200 that facilitates risk assessment of AI models in accordance with one or more embodiments described herein. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

The system 200 comprises a receiving component 220. The receiving component 220 can receive a first risk profile associated with a first artificial intelligence model and a second risk profile associated with a second artificial intelligence model. For example, the receiving component can receive a first risk profile associated with a first artificial intelligence model of AI models 115 and a second risk profile associated with a second artificial intelligence model of AI models 115. In an embodiment, requirements source(s) 118 can comprise one or more sources corresponding to a first artificial intelligence model and one or more sources corresponding to a second artificial intelligence model. In an embodiment, a source of requirements source(s) 118 can comprise risk assessment requirements corresponding to a first artificial intelligence model and risk assessment requirements corresponding to a second artificial intelligence model.

The system 200 comprises a determination component 222. The determination component 222 can determine whether the first risk profile is identical to the second risk profile. The determination component 222 can, in response to a determination that the first risk profile is not identical to the second risk profile, determine whether the first risk profile can be applied to measurements of the second artificial intelligence model. In an embodiment, if there exist measurements of the second artificial intelligence model that correspond to each of the metrics of the first risk profile, the first risk profile can be applied to the measurements of the second artificial intelligence model. The determination component 222 can further, in response to a determination that the first risk profile cannot be applied to the second artificial intelligence model, determine whether the second risk profile can be applied to measurements of the first artificial intelligence model. In an embodiment, if there exist measurements for the first artificial intelligence model that correspond to each of the metrics of the second risk profile, the second risk profile can be applied to the measurements of first artificial intelligence model. The determination component 222 can further, in response to a determination that the second risk profile cannot be applied to the measurements of the first artificial intelligence model, determine whether the first risk profile and the second risk profile comprise intersecting metrics associated with common measurements of the first artificial intelligence model and the second artificial intelligence model.

The system 200 further comprises a score conversion component 224. The score conversion component 224 can, in response to a determination that the first risk profile can be applied to the measurements of the second artificial intelligence model, calculate a second converted risk assessment score for the second artificial intelligence model based on the first risk profile and the measurements of the second artificial intelligence model. In an embodiment, the first risk profile can be applied to the measurements of the second artificial intelligence model. The second converted risk assessment score for the second artificial intelligence model can be meaningfully compared to a first customized score for the first artificial intelligence model (e.g., as calculated by customized score component 116). In an embodiment, the second converted risk assessment score for the second artificial intelligence model and the first customized score for the first artificial intelligence model can be compared by a comparison component 226. In another embodiment, the second converted risk assessment score for the second artificial intelligence model and the first customized score for the first artificial intelligence model can be presented to a user or other entity for comparison via a user interface (not pictured).

In another embodiment, the score conversion component 224 can, in response to a determination that the second risk profile can be applied to the measurements of the first artificial intelligence model, calculate a first converted risk assessment score for the first artificial intelligence model based on the second risk profile and the measurements of the first artificial intelligence model. In an embodiment, the second risk profile can be applied to the measurements of the first artificial intelligence model corresponding to the metrics of the second risk profile. The first converted risk assessment score for the first artificial intelligence model can be meaningfully compared to a second customized score for the second artificial intelligence model (e.g., as calculated by customized score component 116). In an embodiment, the first converted risk assessment score for the first artificial intelligence model and the second customized score for the second artificial intelligence model can be compared by comparison component 226. In another embodiment, the first converted risk assessment score for the first artificial intelligence model and the second customized risk assessment score for the second artificial intelligence model can be presented to a user or other entity for comparison via a user interface (not pictured).

In another embodiment, the score conversion component 224 can, in response to a determination that the first risk profile and the second risk profile comprise intersecting metrics associated with common measurements of the first artificial intelligence model and the second artificial intelligence model, calculate a first converted risk assessment score based on a third risk profile comprising a configuration of the intersecting metrics and the measurements of the first artificial intelligence model and a second converted risk assessment score based on the third risk profile and the measurements of the second artificial intelligence model. In an embodiment, the score conversion component 224 can generate the third risk profile. The first converted risk assessment score for the first artificial intelligence model and the second converted risk assessment score for the artificial intelligence model can be meaningfully compared. In an embodiment, the first converted risk assessment score and the second converted risk assessment score can be compared by the comparison component 226. In another embodiment, the first converted risk assessment score and the second converted risk assessment score can be presented to a user or other entity for comparison via a user interface (not pictured).

In an embodiment, the configuration of the intersecting metrics can comprise a portion of the first risk profile. In another embodiment, the configuration of the intersecting metrics can comprise a portion of the second risk profile. In another embodiment, the configuration of the intersecting metrics can comprise a combination of the first risk profile and the second risk profile. In another embodiment, the configuration of the intersecting metrics can comprise a combination of more than two risk profiles. In an embodiment, the configuration of the intersecting metrics can be selected based on the risk assessment requirements associated with the first artificial intelligence model and the second artificial intelligence model. In another embodiment, the configuration of the intersecting metrics can be selected based on an intended application or use case for the models. In another embodiment, the configuration of the intersecting metrics can be selected based on input from a user or other entity. In another embodiment, the configuration of the intersecting metrics can comprise a maximum number of intersecting metrics. In an embodiment, intersecting metrics may be normalized in the configuration of the intersecting metrics. The normalization of the intersecting metrics can be based in part on the weighted dimensions associated with the intersecting metrics.

In an embodiment the first artificial intelligence model and the second artificial intelligence model can be different models or different versions or applications of the same model.

In an embodiment, the system 200 can calculate comparable scores for three or more artificial intelligence models such as AI models 115. In an embodiment the comparable scores can comprise one customized risk assessment score and two or more converted risk assessment scores. In another embodiment, the comparable scores can comprise a converted risk assessment score for each model. In another embodiment, the comparison component 226 can iteratively compare risk assessment scores for two models at a time as part of a comparison of three or more models. In an embodiment, the comparison component 226 can generate a report presenting comparable scores for two or more models in a human interpretable format. In an embodiment, the report can include an indication of business-level terms associated with respective scores. For example, the business level terms can be determined by evaluating the risk profile or configuration of intersecting metrics used to determine the score.

Figure 3:
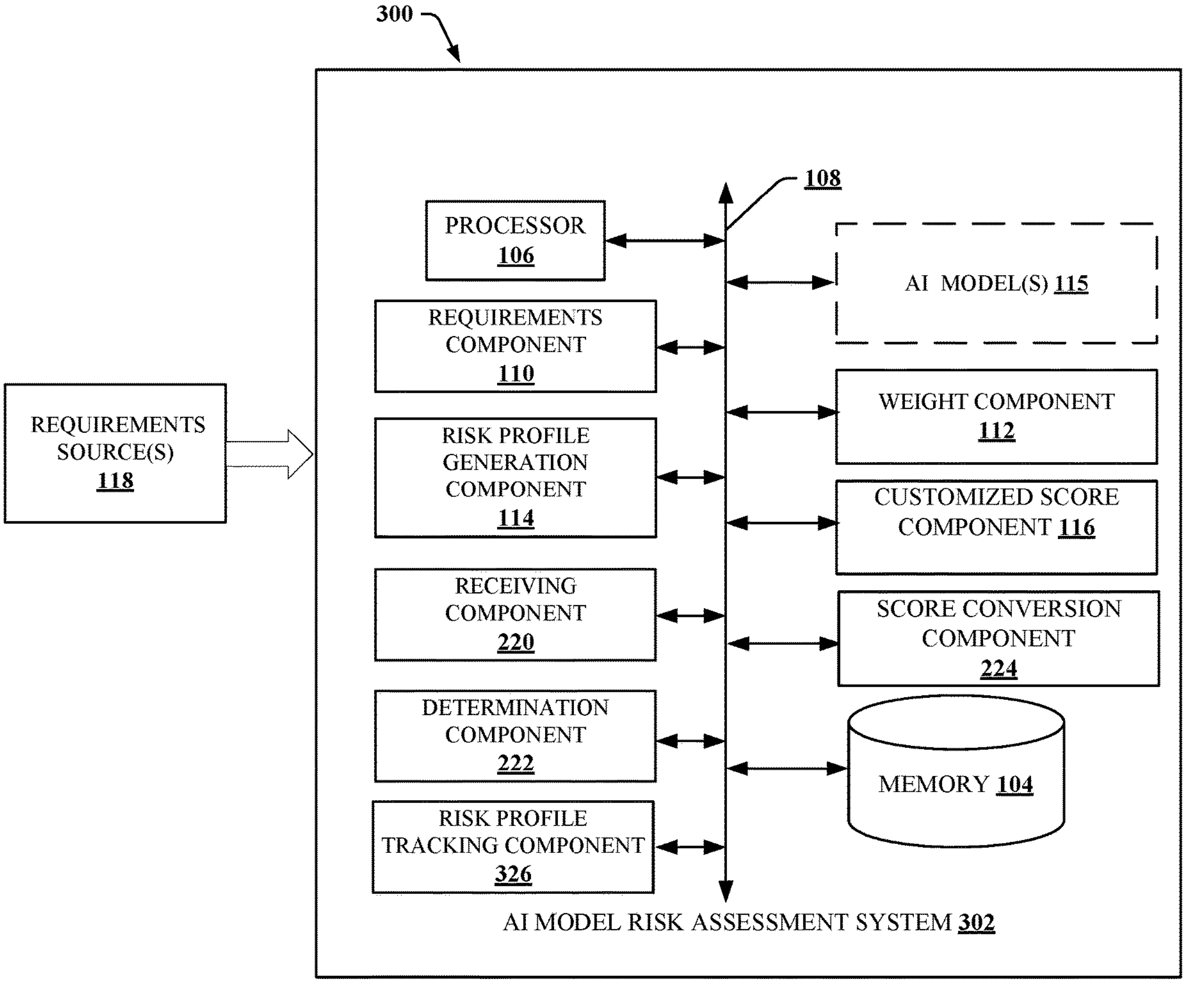
FIG. 3 illustrates another block diagram of an example, non-limiting system that can facilitate risk assessment for one or more artificial intelligence models, in accordance with one or more embodiments described herein.

FIG. 3 illustrates a block diagram of an example, non-limiting system 300 that facilitates risk assessment of AI models in accordance with one or more embodiments described herein. Repetitive description of like elements and/or processes employed in respective embodiments is omitted for sake of brevity. As indicated previously, description relative to an embodiment of FIGS. 1 and 2 can be applicable to an embodiment of FIG. 3. Likewise, description relative to an embodiment of FIG. 3 can be applicable to an embodiment of FIGS. 1 and 2.

The system 300 comprises a risk profile tracking component 326. The risk profile tracking component 326 can track changes to a risk profile over time. Over time, the most appropriate risk assessment requirements for a model may change. For example, new regulations or policies may be imposed. For another example, new data from the model may indicate new vulnerabilities that need to be addressed (e.g., via new relevant dimensions or metrics). In an embodiment, the risk profile tracking component 326 can alert a user or other entity to changes that may necessitate a new risk assessment via a user interface (not pictured). In another embodiment, a change recognized by the risk profile tracking component 326 that necessitates a new risk assessment can prompt a new risk assessment for the model.

Figure 4:
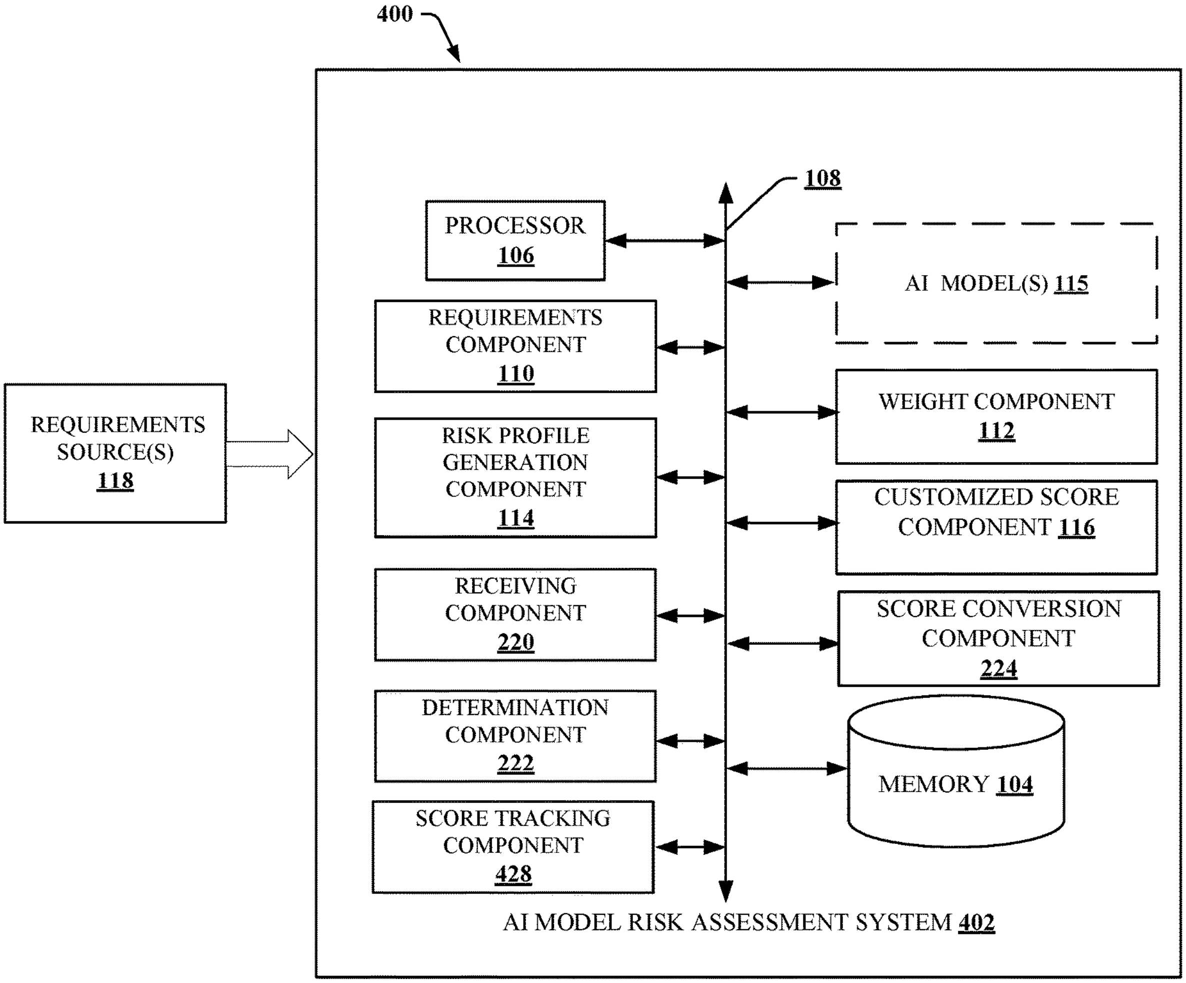
FIG. 4 illustrates another block diagram of an example, non-limiting system that can facilitate risk assessment for one or more artificial intelligence models, in accordance with one or more embodiments described herein.

FIG. 4 illustrates a block diagram of an example, non-limiting system 400 that facilitates risk assessment of AI models in accordance with one or more embodiments described herein. Repetitive description of like elements and/or processes employed in respective embodiments is omitted for sake of brevity. As indicated previously, description relative to an embodiment of FIGS. 1-3 can be applicable to an embodiment of FIG. 4. Likewise, description relative to an embodiment of FIG. 4 can be applicable to an embodiment of FIGS. 1-3.

The system 400 comprises a score tracking component 428. The score tracking component 428 can track changes to a customized risk assessment score or converted risk assessment score over time. Over time, the most appropriate risk assessment requirements for a model may change. For example, new regulations or policies may be imposed. For another example, new data from the model may indicate new vulnerabilities that need to be addressed (e.g., via new relevant dimensions or metrics). In an embodiment, a risk assessment score may change as a result of new measurements of an artificial intelligence model being collected (e.g., a model can be subject to ongoing monitoring). In an embodiment, the score tracking component 428 can alert a user or other entity to changes that may necessitate a new risk assessment. In another embodiment, a change recognized by the score tracking component 428 that necessitates a new risk assessment can prompt a new risk assessment for the model. For example, a change can be a score falling below a predetermined threshold.

Figure 5:
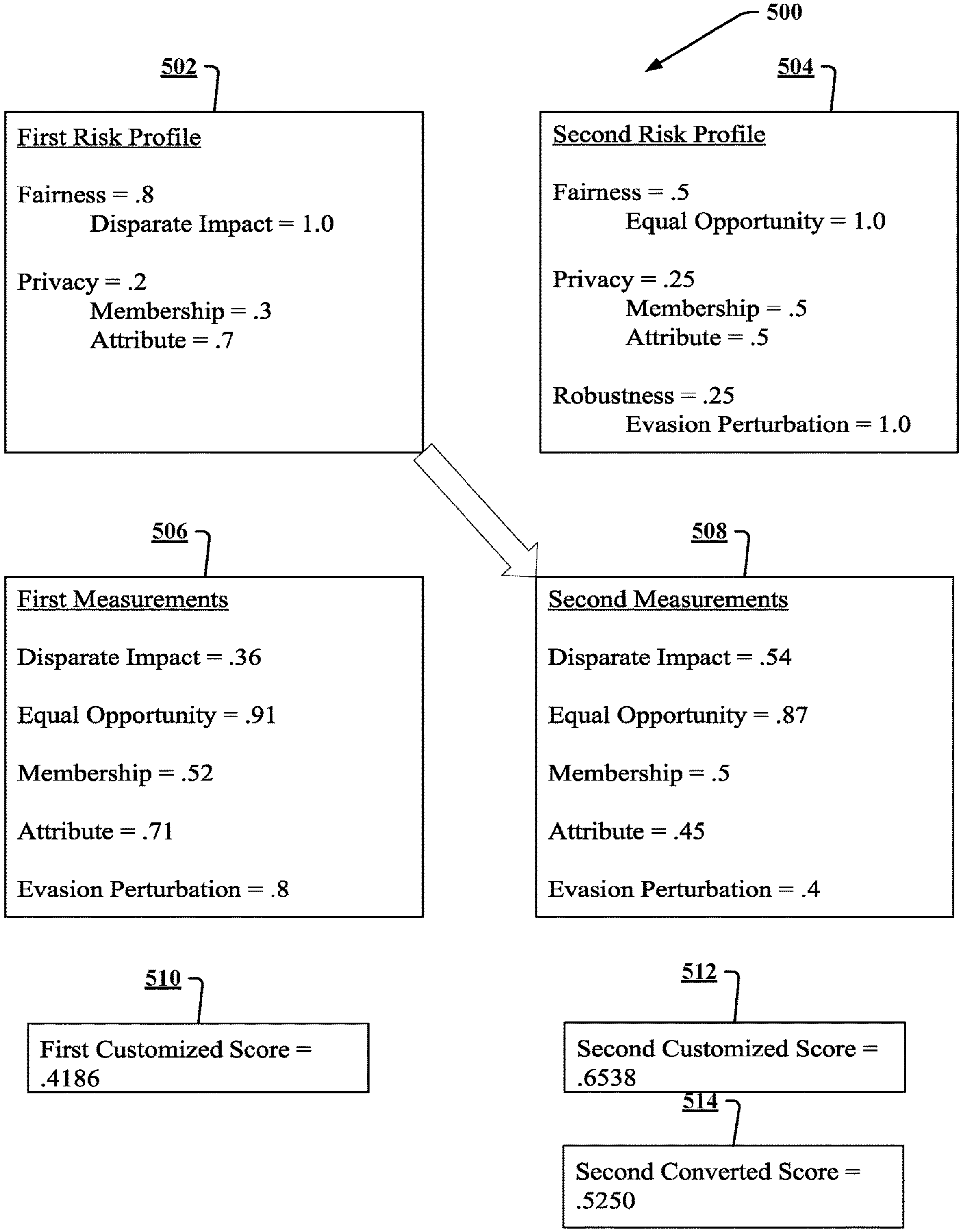
FIG. 5 illustrates a non-limiting example of risk profiles, measurements, and scores in accordance with one or more embodiments described herein.

FIG. 5 illustrates a non-limiting example of risk profiles, measurements, and scores in accordance with one or more embodiments described herein. In FIG. 5, a first risk profile 502 associated with a first artificial intelligence model and a second risk profile 504 associated with a second artificial intelligence model are not identical. The first risk profile 502, however, can be applied to second measurements 508 associated with the second artificial intelligence model (e.g., by score conversion component 224) resulting in the second converted risk assessment score 514. The second converted risk assessment score 514 can be compared (e.g., by the comparison component 226) to the first customized risk assessment score 510 (e.g., calculated by customized score component 116).

Figure 6:
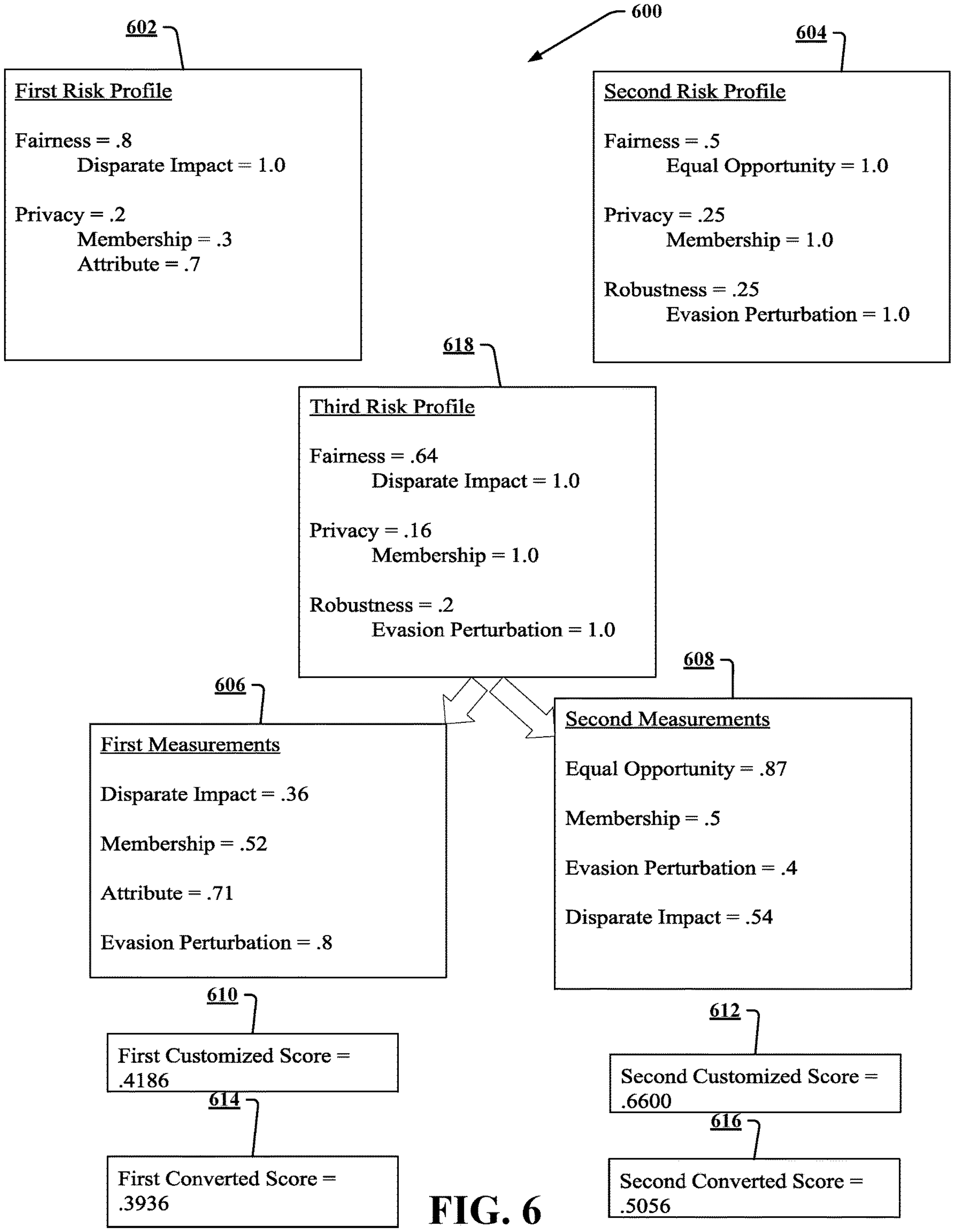
FIG. 6 illustrates a non-limiting example of risk profiles, measurements, and scores in accordance with one or more embodiments described herein.

FIG. 6 illustrates a non-limiting example of risk profiles, measurements, and scores in accordance with one or more embodiments described herein. In FIG. 6 first risk profile 602 associated with a first artificial intelligence model and second risk profile 604 associated with a second artificial intelligence model are not identical. Further, first risk profile 602 cannot be applied to second measurements 608 associated with the second artificial intelligence model and second risk profile 604 cannot be applied to first measurements 606 associated with the first artificial intelligence model. However, the first measurements 606 and the second measurements 608 have intersecting metrics associated with the first risk profile 602 and the second risk profile 604 (i.e., Disparate Impact, Membership, and Evasion Perturbation). The third risk profile 618 can be determined (e.g., by score conversion component 224) based on the intersecting metrics. The third risk profile 618 can be applied to the first measurements 606 and the second measurements 608 to calculate the first converted score 614 and the second converted score 616. The first converted risk assessment score 614 and the second converted risk assessment score 616 are comparable to each other.

The determination of the third risk profile 618 is not limited by the above example. In an embodiment, a third risk profile 618 can comprise a partial profile of a first risk profile 602 or a second risk profile 604. In another embodiment, the third risk profile 618 can comprise a partial risk profile of a first risk profile 602 and a partial risk profile of a second risk profile 604. The weights of the dimensions and metrics of the third risk profile 618 can be determined through any combination of the weights of the first risk profile 602 and the second risk profile 604.

Figure 7:
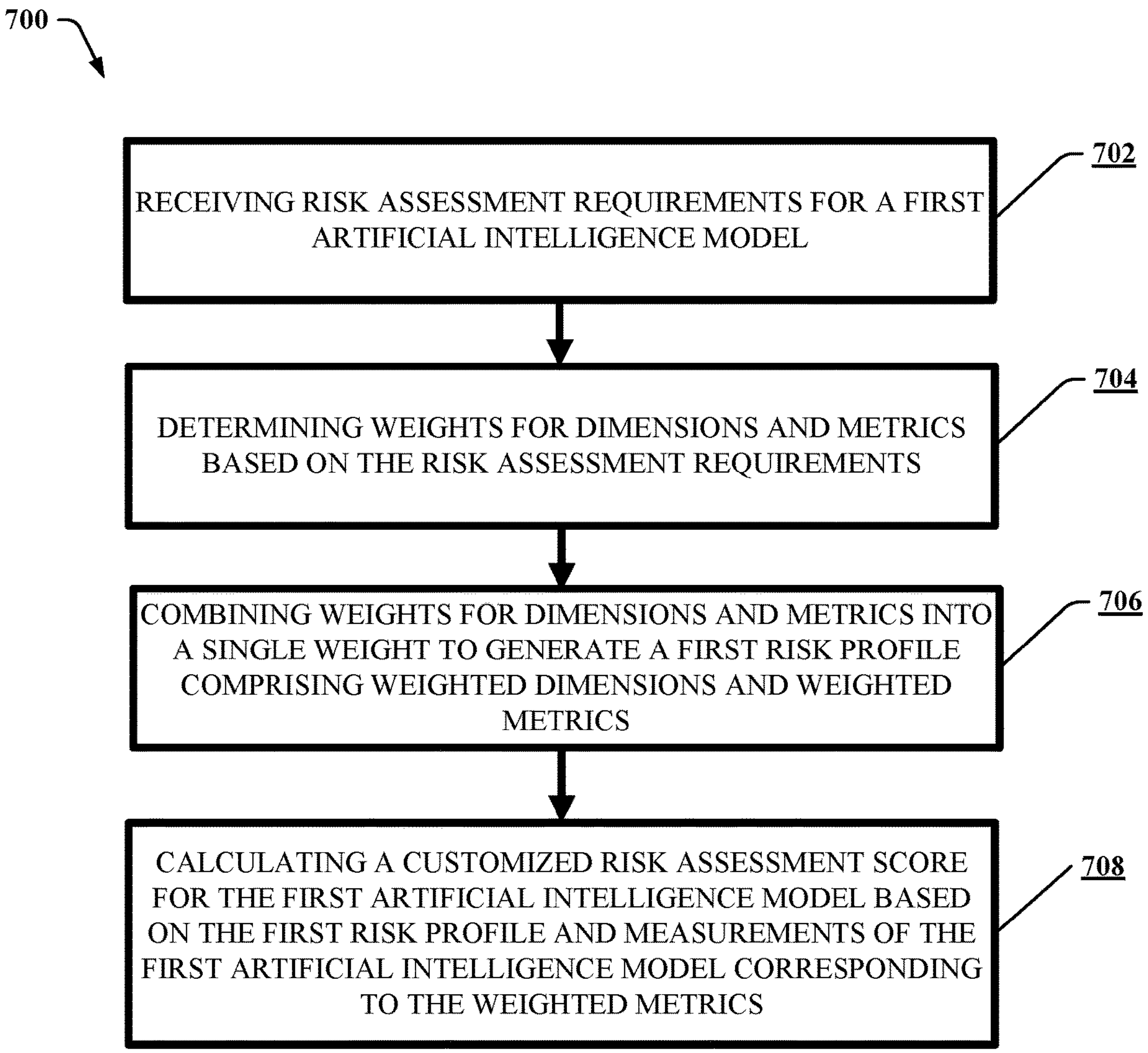
FIG. 7 illustrates a flow diagram of an example, non-limiting computer-implemented method in accordance with one or more embodiments described herein.

FIG. 7 illustrates a flow diagram of an example, non-limiting method 700 that can facilitate risk assessment of AI models, in accordance with one or more embodiments described herein, such as the non-limiting system 100 of FIG. 1. While the non-limiting method 700 is described relative to the non-limiting system 100 of FIG. 1, the non-limiting method 700 can be applicable also to other systems described herein. Repetitive description of like elements and/or processes employed in respective embodiments is omitted for sake of brevity. At 702, the non-limiting method 700 can comprise receiving, by a system, (e.g., requirements component 110) risk assessment requirements for a first artificial intelligence model. At 704, the non-limiting method 700 can comprise determining, by the system, (e.g., weight component 112) weights for dimensions and metrics based on the risk assessment requirements. At 706, the non-limiting method 700 can comprise combining, by the system, (e.g., risk profile generation component 114) weights for dimensions and metrics into a single set of weights to generate a first risk profile comprising weighted dimensions and weighted metrics. At 708, the non-limiting method 700 can comprises calculating, by the system, (e.g., customized score component 116) a customized risk assessment score for the first artificial intelligence model based on the first risk profile and measurements of the first artificial intelligence model corresponding to the weighted metrics.

Figure 8:
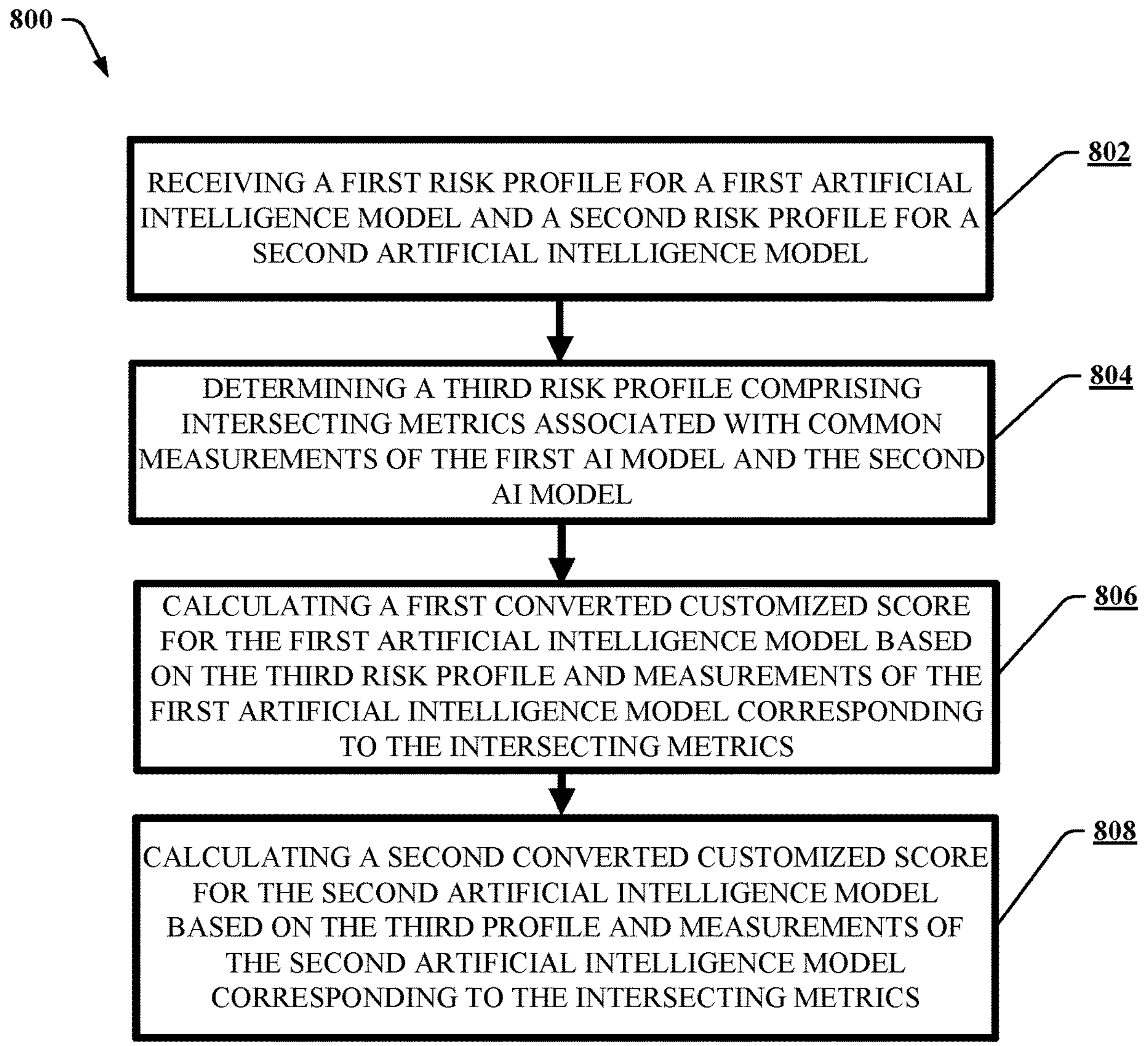
FIG. 8 illustrates a flow diagram of an example, non-limiting computer-implemented method in accordance with one or more embodiments described herein.

Next, FIG. 8 illustrates a flow diagram of an example, non-limiting method 800 that can facilitate risk assessment of AI models in accordance with one or more embodiments described herein, such as the non-limiting system 200 of FIG. 2. While the non-limiting method 800 is described relative to the non-limiting system 200 of FIG. 2, the non-limiting method 800 can be applicable also to other systems described herein, such as the non-limiting system 100 of FIG. 1. Repetitive description of like elements and/or processes employed in respective embodiments is omitted for sake of brevity. At 802, the non-limiting method 800 can comprise receiving, by a system (e.g., receiving component 220) a first risk profile for a first artificial intelligence model and a second risk profile for a second artificial intelligence model. At 804, the non-limiting method 800 can comprises determining, by the system, (e.g., score conversion component 224) a third risk profile comprising intersecting metrics associated with common measurements of the first artificial intelligence model and the second artificial intelligence model. At 806, the non-limiting method 800 can comprise calculating, by the system, (e.g., score conversion component 224) a first converted risk assessment score for the first artificial intelligence model based the third risk profile and measurements associated with the first artificial intelligence model corresponding to the intersecting metrics. At 808 the non-limiting method 800 can comprise calculating, by the system, (e.g., score conversion component 224) a second converted risk assessment score for the second artificial intelligence model based on the third risk profile and measurements associated with the second artificial intelligence model corresponding to the intersecting metrics.

Figure 9:
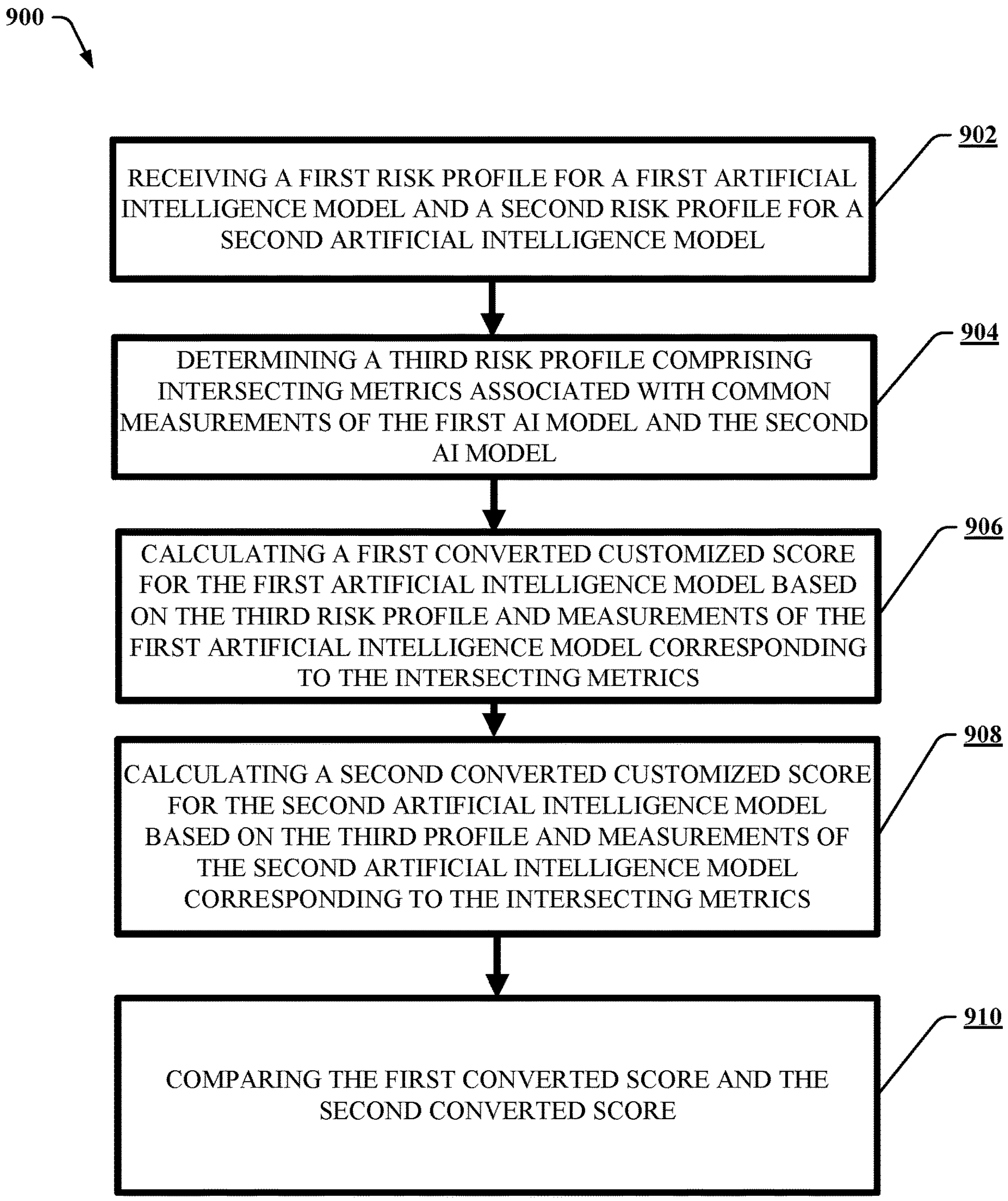
FIG. 9 illustrates a flow diagram of an example, non-limiting computer-implemented method in accordance with one or more embodiments described herein.

Next, FIG. 9 illustrates a flow diagram of an example, non-limiting method 900 that can facilitate risk assessment of AI models, in accordance with one or more embodiments described herein, such as the non-limiting system 200 of FIG. 2. While the non-limiting method 900 is described relative to the non-limiting system 200 of FIG. 2, the non-limiting method 900 can be applicable also to other systems described herein, such as the non-limiting system 100 of FIG. 1. Repetitive description of like elements and/or processes employed in respective embodiments is omitted for sake of brevity. At 902, the non-limiting method 900 can comprise receiving, by a system (e.g., receiving component 220) a first risk profile for a first artificial intelligence model and a second risk profile for a second artificial intelligence model. At 904, the non-limiting method 900 can comprises determining, by the system, (e.g., score conversion component 224) a third risk profile comprising intersecting metrics associated with common measurements of the first artificial intelligence model and the second artificial intelligence model. At 906, the non-limiting method 900 can comprise calculating, by the system, (e.g., score conversion component 224) a first converted risk assessment score for the first artificial intelligence model based the third risk profile and measurements associated with the first artificial intelligence model corresponding to the intersecting metrics. At 908 the non-limiting method 900 can comprise calculating, by the system, (e.g., score conversion component 224) a second converted risk assessment score for the second artificial intelligence model based on the third risk profile and measurements associated with the second artificial intelligence model corresponding to the intersecting metrics. At 910, the non-limiting method 900 can comprise comparing, by the system, (e.g., the comparison component 226) the first converted risk assessment score and the second converted risk assessment score.

Figure 10:
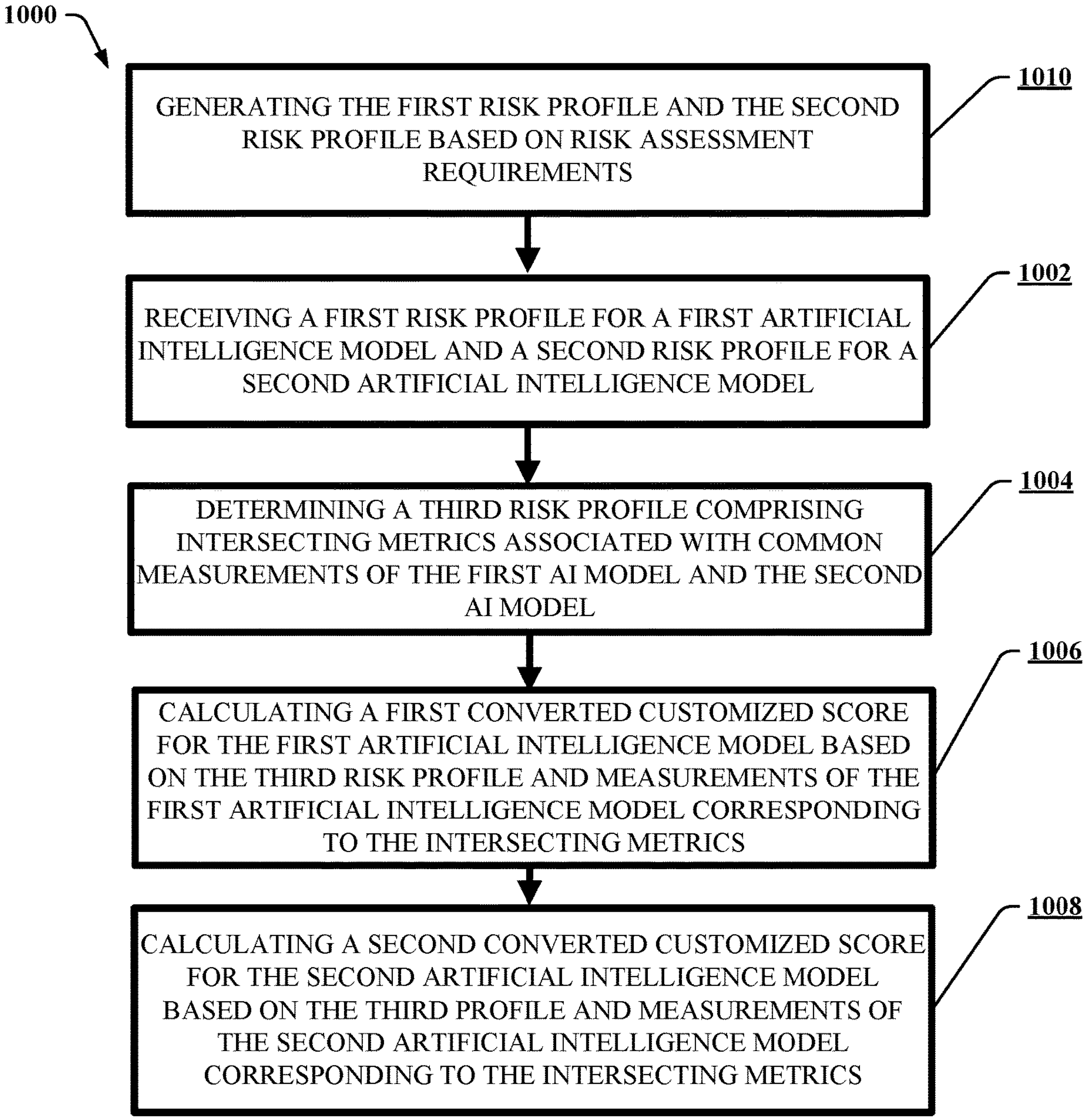
FIG. 10 illustrates a flow diagram of an example, non-limiting computer-implemented method in accordance with one or more embodiments described herein.

Next, FIG. 10 illustrates a flow diagram of an example, non-limiting method 1000 that can facilitate risk assessment for AI models, in accordance with one or more embodiments described herein, such as the non-limiting system 200 of FIG. 2. While the non-limiting method 1000 is described relative to the non-limiting system 200 of FIG. 2, the non-limiting method 1000 can be applicable also to other systems described herein, such as the non-limiting system 100 of FIG. 1. Repetitive description of like elements and/or processes employed in respective embodiments is omitted for sake of brevity. At 1010, the non-limiting method 1000 can comprise generating, by the system (e.g., risk profile generation component 114) the first risk profile and the second risk profile based on risk assessment requirements. At 1002, the non-limiting method 1000 can comprise receiving, by a system (e.g., receiving component 220) a first risk profile for a first artificial intelligence model and a second risk profile for a second artificial intelligence model. At 1004, the non-limiting method 1000 can comprises determining, by the system, (e.g., score conversion component 224) a third risk profile comprising intersecting metrics associated with common measurements of the first artificial intelligence model and the second artificial intelligence model. At 1006, the non-limiting method 1000 can comprise calculating, by the system, (e.g., score conversion component 224) a first converted risk assessment score for the first artificial intelligence model based the third risk profile and measurements associated with the first artificial intelligence model corresponding to the intersecting metrics. At 1008 the non-limiting method 1000 can comprise calculating, by the system, (e.g., score conversion component 224) a second converted risk assessment score for the second artificial intelligence model based on the third risk profile and measurements associated with the second artificial intelligence model corresponding to the intersecting metrics.

Figure 11:
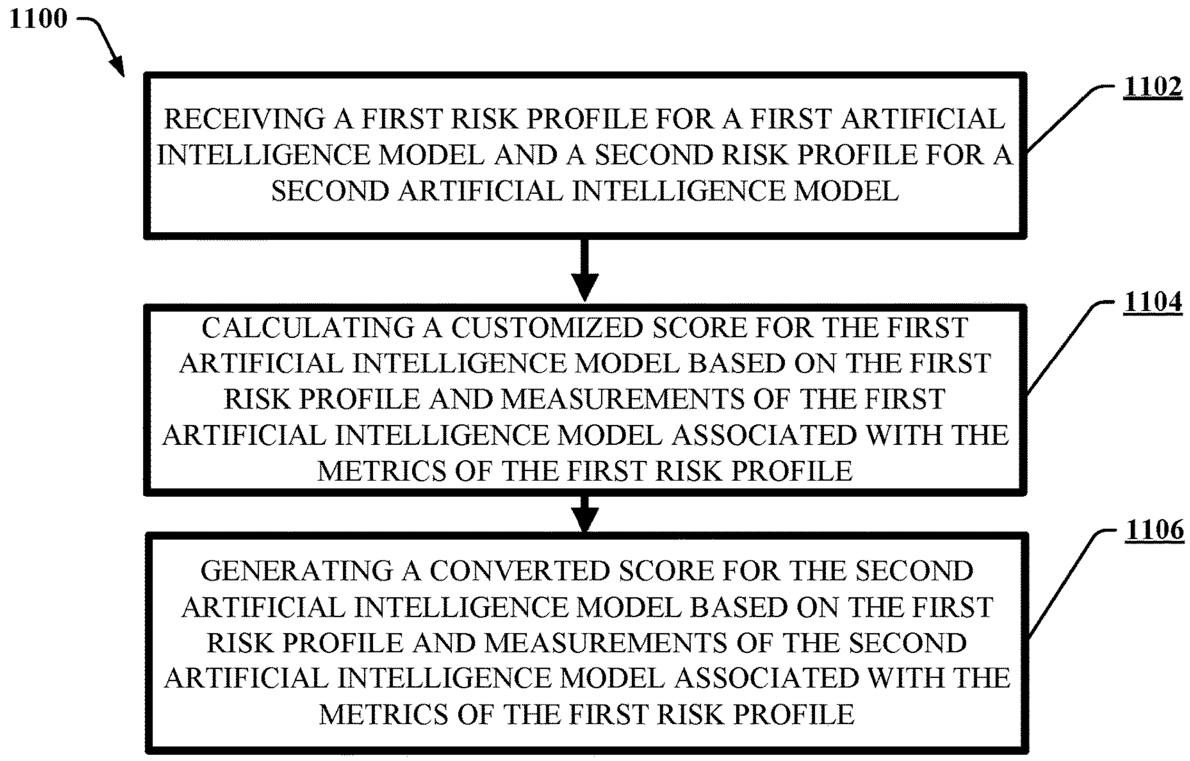
FIG. 11 illustrates a flow diagram of an example, non-limiting computer-implemented method in accordance with one or more embodiments described herein.

Next, FIG. 11 illustrates a flow diagram of an example, non-limiting method 1100 that can facilitate risk assessment for AI models, in accordance with one or more embodiments described herein, such as the non-limiting system 200 of FIG. 2. While the non-limiting method 1100 is described relative to the non-limiting system 200 of FIG. 2, the non-limiting method 1100 can be applicable also to other systems described herein, such as the non-limiting system 100 of FIG. 1. Repetitive description of like elements and/or processes employed in respective embodiments is omitted for sake of brevity. At 1102, the non-limiting method 1100 can comprise receiving, by a system (e.g., receiving component 220) a first risk profile for a first artificial intelligence model and a second risk profile for a second artificial intelligence model. At 1104, the non-limiting method 1100 can comprise calculating, by the system, (e.g., customized score component 116) a first customized risk assessment score for the first artificial intelligence model based on the first risk profile and measurements of the first artificial intelligence model associated with metrics of the first risk profile. At 1106, the non-limiting method 1100 can comprise generating, by the system, (e.g., score conversion component 224) a second converted risk assessment score for the second artificial intelligence model based on the first risk profile and measurements associated with the second artificial intelligence model associated with metrics of the first risk profile.

Figure 12:
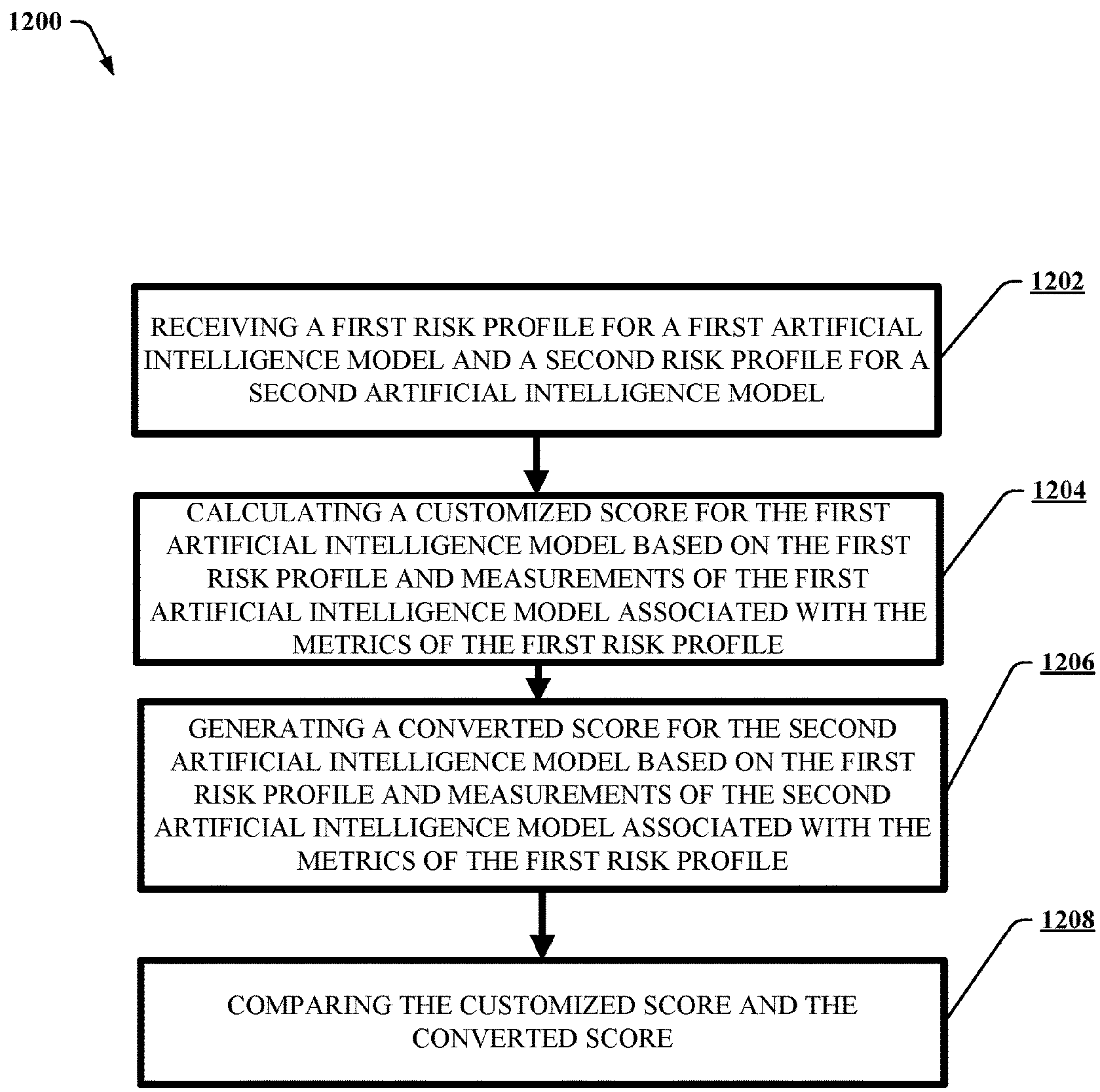
FIG. 12 illustrates a flow diagram of an example, non-limiting computer-implemented method in accordance with one or more embodiments described herein.

Next, FIG. 12 illustrates a flow diagram of an example, non-limiting method 1200 that can facilitate risk assessment for AI models, in accordance with one or more embodiments described herein, such as the non-limiting system 200 of FIG. 2. While the non-limiting method 1200 is described relative to the non-limiting system 200 of FIG. 2, the non-limiting method 1200 can be applicable also to other systems described herein, such as the non-limiting system 100 of FIG. 1. Repetitive description of like elements and/or processes employed in respective embodiments is omitted for sake of brevity. At 1202, the non-limiting method 1200 can comprise receiving, by a system (e.g., receiving component 220) a first risk profile for a first artificial intelligence model and a second risk profile for a second artificial intelligence model. At 1204, the non-limiting method 1200 can comprise calculating, by the system, (e.g., customized score component 116) a first customized risk assessment score for the first artificial intelligence model based on the first risk profile and measurements of the first artificial intelligence model associated with metrics of the first risk profile. At 1206, the non-limiting method 1200 can comprise generating, by the system, (e.g., score conversion component 224) a second converted risk assessment score for the second artificial intelligence model based on the first risk profile and measurements associated with the second artificial intelligence model associated with metrics of the first risk profile. At 1208 the non-limiting method 1200 can comprise comparing, by the system, (e.g., comparison component 226) the first customized risk assessment score and the second converted risk assessment score.

Figure 13:
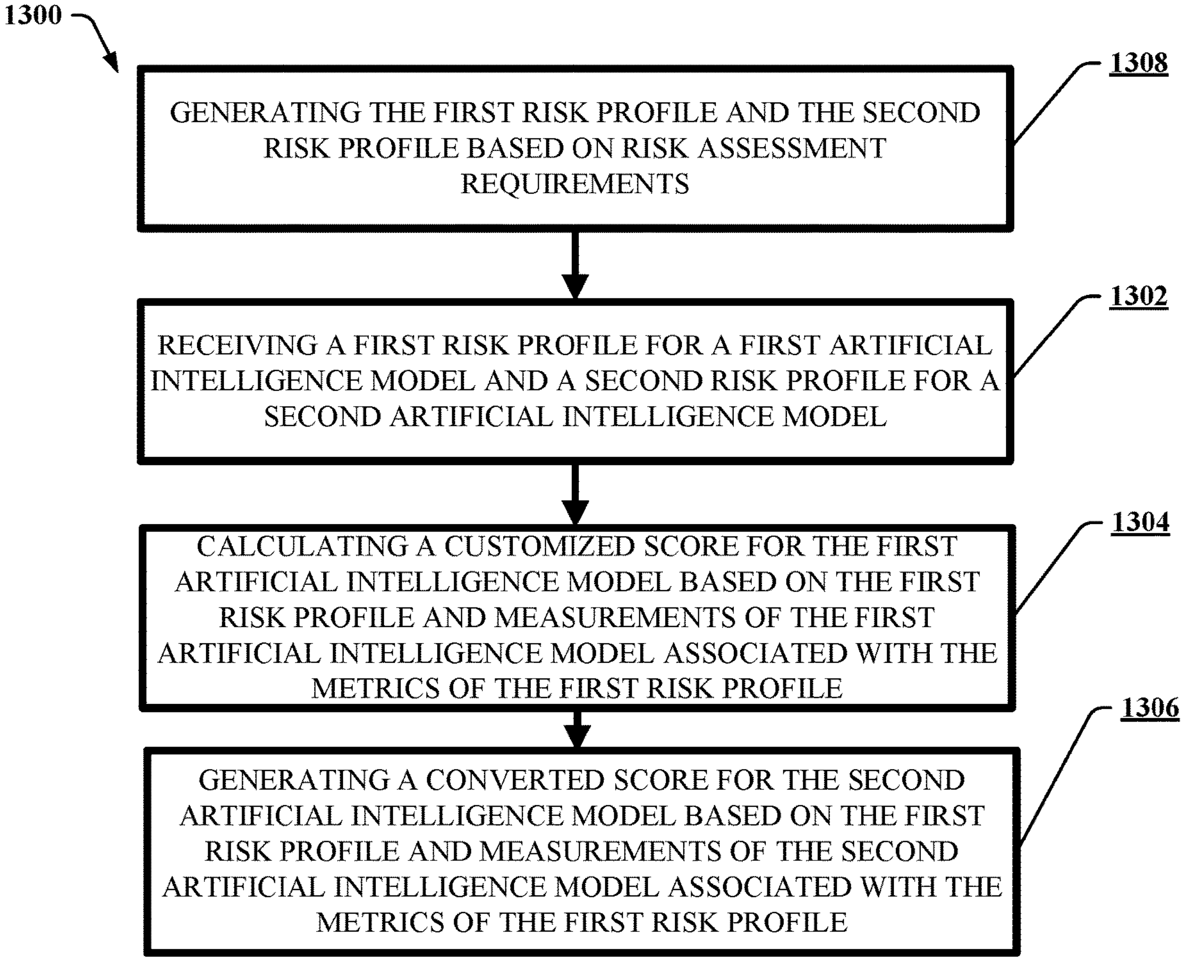
FIG. 13 illustrates a flow diagram of an example, non-limiting computer-implemented method in accordance with one or more embodiments described herein.

Next, FIG. 13 illustrates a flow diagram of an example, non-limiting method 1300 that can facilitate risk assessment for AI models, in accordance with one or more embodiments described herein, such as the non-limiting system 200 of FIG. 2. While the non-limiting method 1300 is described relative to the non-limiting system 200 of FIG. 2, the non-limiting method 1300 can be applicable also to other systems described herein, such as the non-limiting system 100 of FIG. 1. Repetitive description of like elements and/or processes employed in respective embodiments is omitted for sake of brevity. At 1308, the non-limiting method 1300 can comprise generating, by the system (e.g., risk profile generation component 114) the first risk profile and the second risk profile based on risk assessment requirements. At 1302, the non-limiting method 1300 can comprise receiving, by a system (e.g., receiving component 220) a first risk profile for a first artificial intelligence model and a second risk profile for a second artificial intelligence model. At 1304, the non-limiting method 1300 can comprise calculating, by the system, (e.g., customized score component 116) a first customized risk assessment score for the first artificial intelligence model based on the first risk profile and measurements of the first artificial intelligence model associated with metrics of the first risk profile. At 1306, the non-limiting method 1300 can comprise generating, by the system, (e.g., score conversion component 224) a second converted risk assessment score for the second artificial intelligence model based on the first risk profile and measurements associated with the second artificial intelligence model associated with metrics of the first risk profile.

Figure 14:
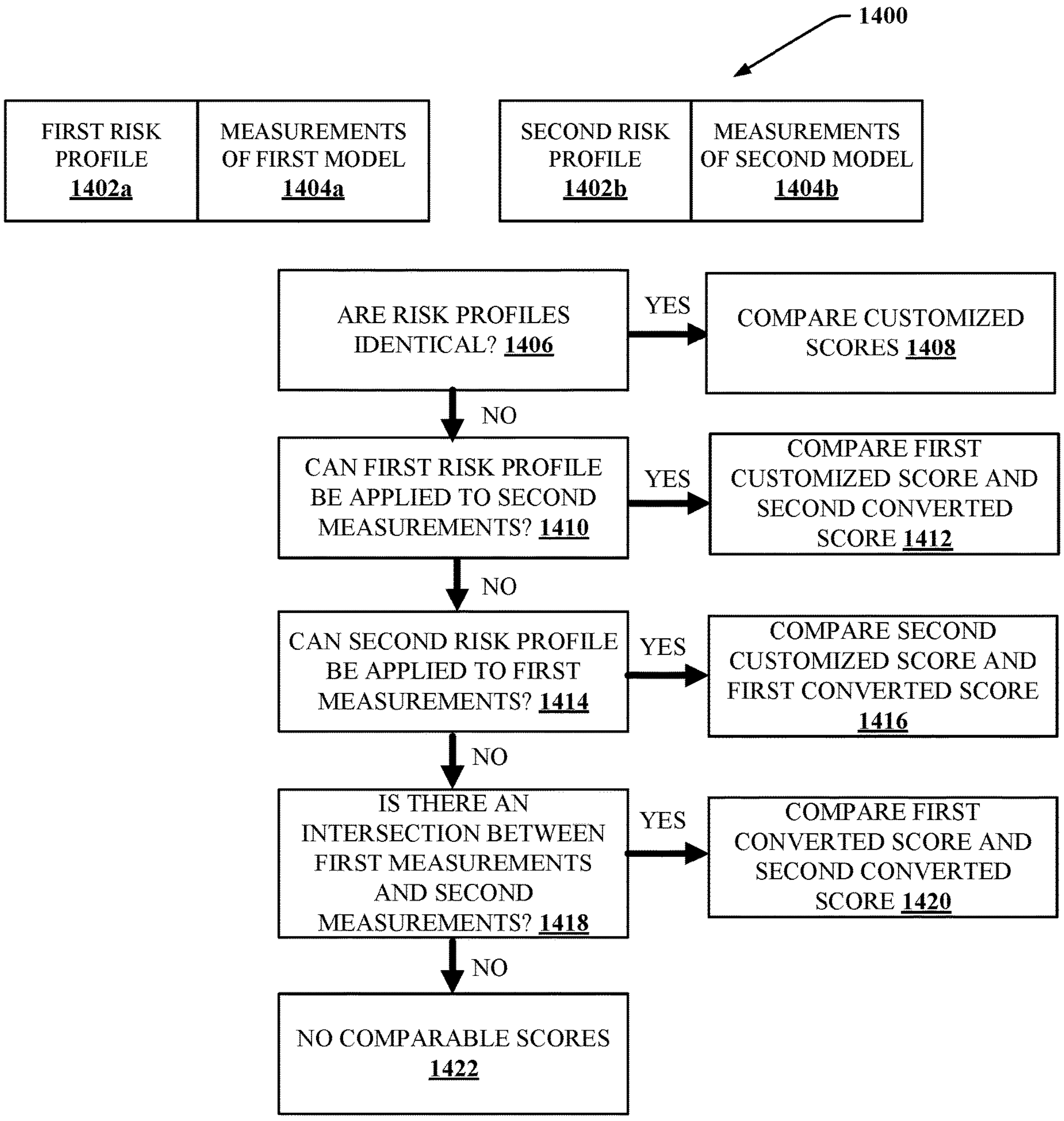
FIG. 14 illustrates a flow diagram of an example, non-limiting computer-implemented method in accordance with one or more embodiments described herein.

Next, FIG. 14 illustrates a flow diagram of an example, non-limiting method 1400 that can facilitate risk assessment for AI models, in accordance with one or more embodiments described herein, such as the non-limiting system 200 of FIG. 2. While the non-limiting method 1400 is described relative to the non-limiting system 200 of FIG. 2, the non-limiting method 1400 can be applicable also to other systems described herein, such as the non-limiting system 100 of FIG. 1. Repetitive description of like elements and/or processes employed in respective embodiments is omitted for sake of brevity. At 1406 the non-limiting method 1400 can comprise determining, by the system, (e.g., determination component 222) whether the first risk profile and the second risk profile are identical. If the first risk profile and the second risk profile at identical, at 1408 the non-limiting method 1400 can comprise comparing, by the system, (e.g., comparison component 226) a customized score for the first model and a customized score for the second model. If the first risk profile and the second risk profile are not identical, at 1410 the non-limiting method 1400 can comprise determining, by the system, (e.g., determination component 222) whether the first risk profile can be applied to measurements associated with the second model. If yes, at 1412 the non-limiting method 1400 can comprise comparing, by the system, (e.g., comparison component 226) a first customized risk assessment score and a second converted risk assessment score. If no, at 1414 the non-limiting method 1400 can comprise determining, by the system, (e.g., determination component 222) whether the second risk profile can be applied to measurements associated with the first model. If yes, at 1416 the non-limiting method 1400 can comprise comparing, by the system, (e.g., comparison component 226) a second customized risk assessment score and a first converted risk assessment score. If no, at 1418 determining, by the system, (e.g., determination component 222) whether there is an intersection between the measurements of the first model and the measurements of the second model. If yes, at 1420 the non-limiting method 1400 can comprise comparing, by the system, (e.g., comparison component 226) a first converted score and a second converted score. If no, at 1422 the non-limiting method cannot compare any scores.

Figure 15:
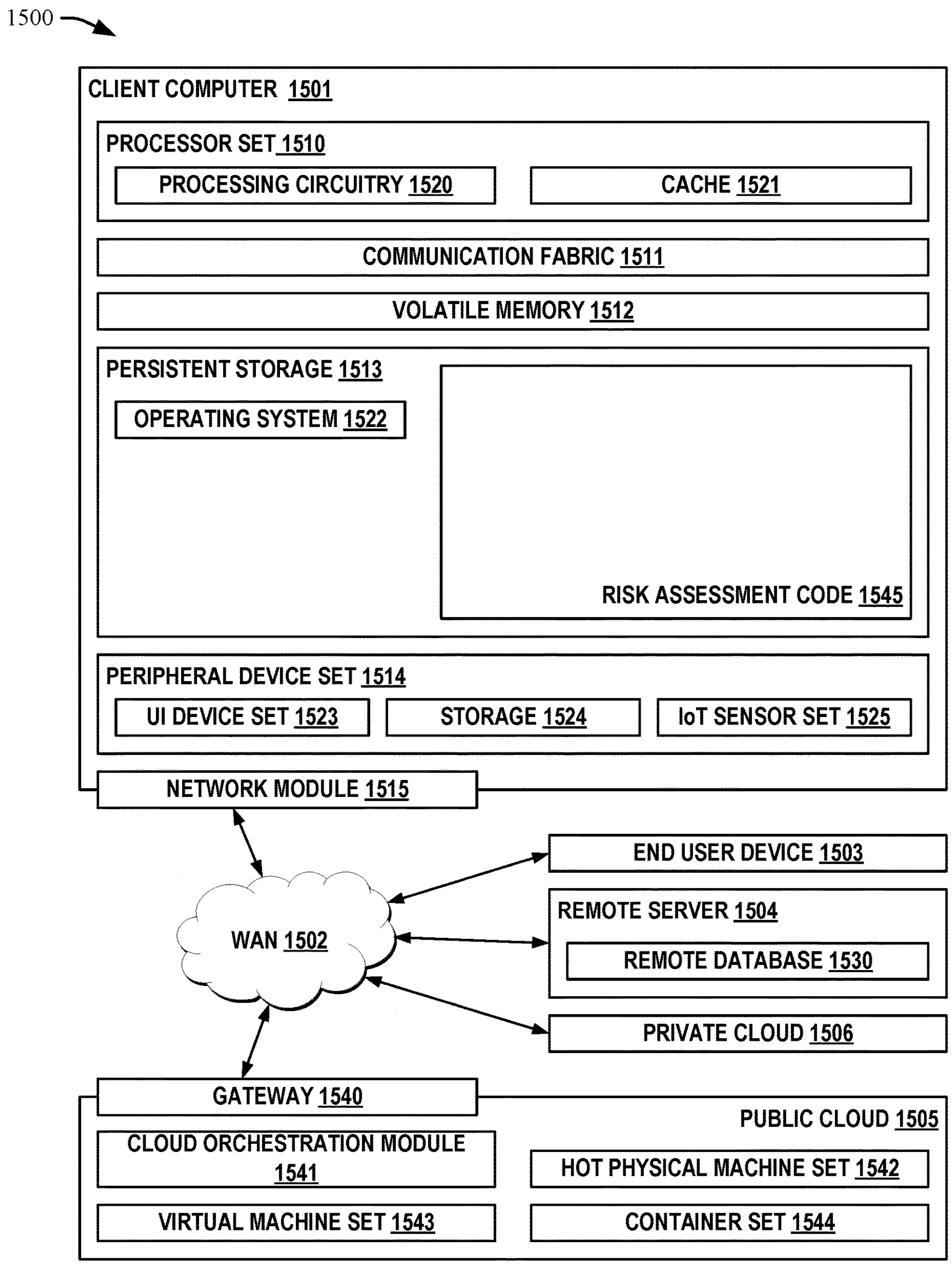
FIG. 15 illustrates a block diagram of an example, computing environment in which one or more embodiments described herein can be facilitated.

Turning next to FIG. 15, a detailed description is provided of additional context for the one or more embodiments described herein at FIGS. 1-14.

FIG. 15 and the following discussion are intended to provide a brief, general description of a suitable computing environment 1500 in which one or more embodiments described herein at FIGS. 1-14 can be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1500 contains an example of an environment for the execution of at least some of the computer code involved in performing the inventive methods, such as risk assessment code 1545. In addition to block 1545, computing environment 1500 includes, for example, computer 1501, wide area network (WAN) 1502, end user device (EUD) 1503, remote server 1504, public cloud 1505, and private cloud 1506. In this embodiment, computer 1501 includes processor set 1510 (including processing circuitry 1520 and cache 1521), communication fabric 1511, volatile memory 1512, persistent storage 1513 (including operating system 1522 and block 1545, as identified above), peripheral device set 1514 (including user interface (UI), device set 1523, storage 1524, and Internet of Things (IoT) sensor set 1525), and network module 1515. Remote server 1504 includes remote database 1530. Public cloud 1505 includes gateway 1540, cloud orchestration module 1541, host physical machine set 1542, virtual machine set 1543, and container set 1544.

COMPUTER 1501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1530. As is well understood in the art of computer technology, and depending upon the technology, performance of a computer-implemented method may be distributed among multiple computers and/or between multiple locations. On the other hand, in this presentation of computing environment 1500, detailed discussion is focused on a single computer, specifically computer 1501, to keep the presentation as simple as possible. Computer 1501 may be located in a cloud, even though it is not shown in a cloud in FIG. 15. On the other hand, computer 1501 is not required to be in a cloud except to any extent as may be affirmatively indicated.

PROCESSOR SET 1510 includes one, or more, computer processors of any type now known or to be developed in the future. Processing circuitry 1520 may be distributed over multiple packages, for example, multiple, coordinated integrated circuit chips. Processing circuitry 1520 may implement multiple processor threads and/or multiple processor cores. Cache 1521 is memory that is located in the processor chip package(s) and is typically used for data or code that should be available for rapid access by the threads or cores running on processor set 1510. Cache memories are typically organized into multiple levels depending upon relative proximity to the processing circuitry. Alternatively, some, or all, of the cache for the processor set may be located "off chip." In some computing environments, processor set 1510 may be designed for working with qubits and performing quantum computing.

Computer readable program instructions are typically loaded onto computer 1501 to cause a series of operational steps to be performed by processor set 1510 of computer 1501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1521 and the other storage media discussed below. The program instructions, and associated data, are accessed by processor set 1510 to control and direct performance of the inventive methods. In computing environment 1500, at least some of the instructions for performing the inventive methods may be stored in block 1545 in persistent storage 1513.

COMMUNICATION FABRIC 1511 is the signal conduction paths that allow the various components of computer 1501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1512 is any type of volatile memory now known or to be developed in the future. Examples include dynamic type random access memory (RAM) or static type RAM. Typically, the volatile memory is characterized by random access, but this is not required unless affirmatively indicated. In computer 1501, the volatile memory 1512 is located in a single package and is internal to computer 1501, but, alternatively or additionally, the volatile memory may be distributed over multiple packages and/or located externally with respect to computer 1501.

PERSISTENT STORAGE 1513 is any form of non-volatile storage for computers that is now known or to be developed in the future. The non-volatility of this storage means that the stored data is maintained regardless of whether power is being supplied to computer 1501 and/or directly to persistent storage 1513. Persistent storage 1513 may be a read only memory (ROM), but typically at least a portion of the persistent storage allows writing of data, deletion of data and re-writing of data. Some familiar forms of persistent storage include magnetic disks and solid state storage devices. Operating system 1522 may take several forms, such as various known proprietary operating systems or open source Portable Operating System Interface type operating systems that employ a kernel. The code included in block 1545 typically includes at least some of the computer code involved in performing the inventive methods.

PERIPHERAL DEVICE SET 1514 includes the set of peripheral devices of computer 1501. Data communication connections between the peripheral devices and the other components of computer 1501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1523 may include components such as a display screen, speaker, microphone, wearable devices (such as goggles and smart watches), keyboard, mouse, printer, touchpad, game controllers, and haptic devices. Storage 1524 is external storage, such as an external hard drive, or insertable storage, such as an SD card. Storage 1524 may be persistent and/or volatile. In some embodiments, storage 1524 may take the form of a quantum computing storage device for storing data in the form of qubits. In embodiments where computer 1501 is required to have a large amount of storage (for example, where computer 1501 locally stores and manages a large database) then this storage may be provided by peripheral storage devices designed for storing very large amounts of data, such as a storage area network (SAN) that is shared by multiple, geographically distributed computers. IoT sensor set 1525 is made up of sensors that can be used in Internet of Things applications. For example, one sensor may be a thermometer and another sensor may be a motion detector.

NETWORK MODULE 1515 is the collection of computer software, hardware, and firmware that allows computer 1501 to communicate with other computers through WAN 1502. Network module 1515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1515 are performed on the same physical hardware device. In other embodiments (for example, embodiments that utilize software-defined networking (SDN)), the control functions and the forwarding functions of network module 1515 are performed on physically separate devices, such that the control functions manage several different network hardware devices. Computer readable program instructions for performing the inventive methods can typically be downloaded to computer 901 from an external computer or external storage device through a network adapter card or network interface included in network module 1515.

WAN 1502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1503 is any computer system that is used and controlled by an end user (for example, a customer of an enterprise that operates computer 1501), and may take any of the forms discussed above in connection with computer 1501. EUD 1503 typically receives helpful and useful data from the operations of computer 1501. For example, in a hypothetical case where computer 1501 is designed to provide a recommendation to an end user, this recommendation would typically be communicated from network module 1515 of computer 1501 through WAN 1502 to EUD 1503. In this way, EUD 1503 can display, or otherwise present, the recommendation to an end user. In some embodiments, EUD 1503 may be a client device, such as thin client, heavy client, mainframe computer, desktop computer and so on.

REMOTE SERVER 1504 is any computer system that serves at least some data and/or functionality to computer 1501. Remote server 1504 may be controlled and used by the same entity that operates computer 1501. Remote server 1504 represents the machine(s) that collect and store helpful and useful data for use by other computers, such as computer 1501. For example, in a hypothetical case where computer 1501 is designed and programmed to provide a recommendation based on historical data, then this historical data may be provided to computer 1501 from remote database 1530 of remote server 1504.

PUBLIC CLOUD 1505 is any computer system available for use by multiple entities that provides on-demand availability of computer system resources and/or other computer capabilities, especially data storage (cloud storage) and computing power, without direct active management by the scale. The direct and active management of the computing resources of public cloud 1505 is performed by the computer hardware and/or software of cloud orchestration module 1541. The computing resources provided by public cloud 1505 are typically implemented by virtual computing environments that run on various computers making up the computers of host physical machine set 1542, which is the universe of physical computers in and/or available to public cloud 1505. The virtual computing environments (VCEs) typically take the form of virtual machines from virtual machine set 1543 and/or containers from container set 1544. It is understood that these VCEs may be stored as images and may be transferred among and between the various physical machine hosts, either as images or after instantiation of the VCE. Cloud orchestration module 1541 manages the transfer and storage of images, deploys new instantiations of VCEs and manages active instantiations of VCE deployments. Gateway 1540 is the collection of computer software, hardware, and firmware that allows public cloud 1505 to communicate through WAN 1502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1506 is similar to public cloud 1505, except that the computing resources are only available for use by a single enterprise. While private cloud 1506 is depicted as being in communication with WAN 1502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1505 and private cloud 1506 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessorbased or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms “component,” “system,” “platform,” “interface,” or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. Moreover, articles “a” and “an” as used in the subject specification and annexed drawings should generally be construed to mean “one or more” unless specified otherwise or clear from context to be directed to a singular form. As used herein, the terms “example” and/or “exemplary” are utilized to mean serving as an example, instance, or illustration. For the avoidance of doubt, the subject matter disclosed herein is not limited by such examples. In addition, any aspect or design described herein as an “example” and/or “exemplary” is not necessarily to be construed as preferred or advantageous over other aspects or designs, nor is it meant to preclude equivalent exemplary structures and techniques known to those of ordinary skill in the art.

As it is employed in the subject specification, the term “processor” can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as “store,” “storage,” “data store,” data storage,” “database,” and substantially any other information storage component relevant to operation and functionality of a component are utilized to refer to “memory components,” entities embodied in a “memory,” or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms “includes,” “has,” “possesses,” and the like are used in the detailed description, claims, appendices and drawings such terms are intended to be inclusive in a manner similar to the term “comprising” as “comprising” is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:

a memory that stores computer executable components; and a processor that executes computer executable components stored in the memory, wherein the computer executable components comprise:

a requirements component that receives, from a plurality of heterogeneous requirements sources, risk assessment requirements for an artificial intelligence model, wherein the plurality of heterogeneous requirements sources comprise at least one of: a governmental regulation, an organizational policy, or user input a weight component that determines weights for dimensions and metrics based on the risk assessment requirements, and prioritizes the weights based on source-specific priority levels associated with the plurality of heterogeneous requirements sources;

a risk profile generation component that normalizes the weights for dimensions and metrics into a single machine-readable weighted configuration; and generates a risk profile comprising weighted dimensions and weighted metrics corresponding to the normalized weighted configuration; and a customized score component that obtains measurements corresponding to the weighted metrics by testing execution of the artificial intelligence model;

applies the weighted dimensions and weighted metrics of the risk profile to the measurements corresponding to the artificial intelligence model, and calculates a customized risk assessment score representing a summarized risk assessment for the artificial intelligence model based on the applied weighted dimensions and weighted metrics, wherein the customized risk assessment score is configurable according to differing domain-specific risk assessment requirements associated with differing intended applications of the artificial intelligence model.

2. The system of claim 1, wherein the plurality of heterogeneous requirements sources comprise requirements associated with different intended applications of the artificial intelligence model; and the risk profile generation component generates the risk profile by normalizing dimensions and metrics having differing relative priorities associated with the different intended applications.

3. The system of claim 2, wherein the computer executable components further comprise:

a receiving component that receives the risk profile as a first risk profile associated with a first artificial intelligence model and a second risk profile associated with a second artificial intelligence model; and a determination component that determines whether the first risk profile can be applied to measurements of the second artificial intelligence model by determining whether measurements corresponding to metrics of the first risk profile exist for the second artificial intelligence model.

4. The system of claim 3, wherein the computer executable components further comprise:

a score conversion component that, in response to a determination that the first risk profile can be applied to the measurements of the second artificial intelligence model, generates a second converted risk assessment score for the second artificial intelligence model by: applying the weighted dimensions and weighted metrics of the first risk profile to measurements associated with the second artificial intelligence model corresponding to metrics of the first risk profile, wherein the second converted risk assessment score is generated in a common comparison space that enables meaningful comparison between: the customized risk assessment score for the first artificial intelligence model; and the second converted risk assessment score for the second artificial intelligence model.

5. The system of claim 3, wherein in response to a determination that the first risk profile cannot be applied to the measurements of the second artificial intelligence model, the determination component determines whether the second risk profile can be applied to the measurements of the artificial intelligence model by determining whether measurements corresponding to metrics of the second risk profile exist for the first artificial intelligence model.

6. The system of claim 5, wherein the computer executable components further comprise:

a score conversion component that, in response to a determination that the second risk profile can be applied to the measurements of the first artificial intelligence model, generates a first converted risk assessment score for the first artificial intelligence model by applying weighted dimensions and weighted metrics of the second risk profile to measurements associated with the first artificial intelligence model corresponding to metrics of the second risk profile.

7. The system of claim 5, wherein in response to a determination that the second risk profile cannot be applied to the measurements of the first artificial intelligence model, the determination component determines whether the first risk profile and the second risk profile comprise intersecting metrics associated with common measurements of the first artificial intelligence model and the second artificial intelligence model.

8. The system of claim 7, wherein the computer executable components further comprise:

a score conversion component that, in response to a determination that the first risk profile and the second risk profile comprise intersecting metrics, generates a third risk profile comprising a normalized configuration of the intersecting metrics; calculates a first converted risk assessment score based on the third risk profile, and measurements of the first artificial intelligence model corresponding to the intersecting metrics; and calculates a second converted risk assessment score based on the third risk profile, and measurements of the second artificial intelligence model corresponding to the intersecting metrics, wherein the first converted risk assessment score and the second converted risk assessment score are interoperable comparable scores generated from heterogeneous risk assessment profiles.

9. The system of claim 1, further comprising:

a risk profile tracking component that tracks changes to the first risk profile over time based on changes to: the risk assessment requirements, measurements of the artificial intelligence model, or detected vulnerabilities associated with the artificial intelligence model; and initiates generation of an updated risk assessment in response to a detected change satisfying a threshold condition.

10. The system of claim 2, further comprising:

a score tracking component that tracks changes to the customized risk assessment score over time based on updated measurements associated with ongoing monitoring of the artificial intelligence model;

detects whether the customized risk assessment score satisfies a threshold condition; and initiates generation of a new risk assessment in response to detecting satisfaction of the threshold condition.

11. A computer program product facilitating the comparison of risk assessments for multiple artificial intelligence models, the computer program product comprising a computer readable storage medium having program instructions embodied therewith, the program instructions executable by a processor to cause the processor to:

receive a first risk profile for a first artificial intelligence model and a second risk profile for a second artificial intelligence model, wherein the first risk profile and the second risk profile each comprise weighted dimensions and weighted metrics generated from risk assessment requirements associated with differing intended applications of the first artificial intelligence model and the second artificial intelligence model;

obtain measurements associated with execution of the first artificial intelligence model and measurements associated with execution of the second artificial intelligence model;

calculate a first customized risk assessment score for the first artificial intelligence model by applying the weighted dimensions and weighted metrics of the first risk profile to measurements associated with the first artificial intelligence model corresponding to metrics of the first risk profile;

determine whether the first risk profile can be applied to the measurements associated with the second artificial intelligence model by determining whether measurements corresponding to metrics of the first risk profile exist for the second artificial intelligence model; and in response to determining that the first risk profile can be applied to the measurements associated with the second artificial intelligence model, generate a second converted risk assessment score for the second artificial intelligence model by applying the weighted dimensions and weighted metrics of the first risk profile to measurements associated with the second artificial intelligence model corresponding to metrics of the first risk profile, wherein the second converted risk assessment score is generated in a common comparison space that enables interoperable comparison between the first customized risk assessment score and the second converted risk assessment score for heterogeneous artificial intelligence models.

12. The computer program product of claim 11, wherein the program instructions are further executable by the processor to cause the processor to:

compare the first customized risk assessment score and the second converted risk assessment score;

generate comparison output identifying relative risk characteristics associated with the first artificial intelligence model and the second artificial intelligence model; and present the comparison output via a user interface in a human interpretable format.

13. The computer program product of claim 11, wherein the program instructions are further executable by the processor to cause the processor to:

generate the first customized risk profile and the second customized risk profile based on risk assessment requirements of two or more heterogeneous requirements sources comprising at least one of: a governmental regulation, an organizational policy, or user input;

determine source-specific priority levels associated with the two or more heterogeneous requirements sources;

normalize weights for dimensions and metrics based on the source-specific priority levels;

and generate the first risk profile and the second risk profile as machine-readable weighted configurations comprising normalized weighted dimensions and normalized weighted metrics.

* * * * *